United States Patent [19]

Carlson et al.

[11] Patent Number: 4,817,071

[45] Date of Patent: Mar. 28, 1989

[54] DISK-LOADING STATION FOR AUTOMATED DISK LIBRARY

[75] Inventors: Warner P. Carlson; Lawrence W. Wirth, both of Rochester; Dale B. Parks, West Henrietta, all of N.Y.

[73] Assignee: Eastman Kodak Company, Rochester, N.Y.

[21] Appl. No.: 184,841

[22] Filed: Apr. 22, 1988

[51] Int. Cl.[4] .......................... G11B 17/22; G11B 5/48
[52] U.S. Cl. .................................. 369/36; 360/98.06; 360/99.06; 369/34
[58] Field of Search ....................... 369/34, 36, 38, 39; 360/98

[56] References Cited

U.S. PATENT DOCUMENTS

| | | | |
|---|---|---|---|
| 4,502,133 | 2/1985 | Siryj et al. | 369/36 |
| 4,614,474 | 9/1986 | Sudo | 369/36 |
| 4,675,856 | 6/1987 | Rudy et al. | 369/34 |
| 4,691,309 | 9/1987 | Suzuki | 369/38 |

Primary Examiner—Steven L. Stephan
Attorney, Agent, or Firm—Warren W. Kurz

[57] ABSTRACT

A disk-loading station for an automated disk library includes a "lazy-Susan" mechanism which enables disks to be loaded into the library from a direction perpendicular to the direction in which the disks are ultimately transported within the library. Such a loading station enables disks to be loaded through the front wall of the disk library, rather than through an end wall which would increase the space requirements for the library.

5 Claims, 12 Drawing Sheets

DISK-LOADING STATION FOR AUTOMATED DISK LIBRARY

BACKGROUND OF THE INVENTION

The present invention relates to the field of data storage and retrieval. More particularly, it relates to improvements in apparatus for loading data storage disks (e.g. optical, magnetic and magneto-optic disks) into an automated disk library of the type adapted to store and utilize a relatively large number of disks.

Automated disk libraries, sometimes known as "jukeboxes", are known in the art for storing and utilizing a large number of data storage disks. Examples of such libraries are those disclosed in U.S. Pat. Nos. 4,286,790; 4,504,936; 4,608,679; and 4,614,474 and 4,608,679. In such libraries, each data storage disk is housed in a protective cartridge or carrier which surrounds the disk and facilitates disk-handling. The disk carriers are supported by one or more storage racks or the like which serve to arrange the carriers in closely spaced parallel planes, either side-by-side in vertical planes, or one above the other in horizontal planes. Such systems comprise one or more disk drives for playing and/or recording information on a disk, and a disk carrier transport mechanism for transporting selected carriers (and the disks associated therewith) between their respective storage locations and the disk drive units. The disk carriers are commonly provided with a pair of spaced notches or gripping slots on or near one edge so that the carriers can be readily gripped and removed from their assigned storage positions or from their standby positions within a disk drive. In some systems, the disk carrier transport mechanism includes means for selectively rotating or flipping the disk carrier 180° so that either side of the data storage disk can be presented to the disk drive for recording and/or playback.

In the commonly assigned U.S. application Ser. No. 019,903, filed Feb. 27, 1987 in the names of Howard C. Deck et al., there is disclosed an automated disk library of the type described above. In such library, the disk carriers are stored in spaced, horizontal planes, one above the other. To facilitate movement of the disk carriers in the plane of the disk carriers (e.g. to move such carriers into and out of their assigned storage slots), racks of teeth are provided along a pair of opposing, parallel edges of the carrier. Such teeth are adapted to be engaged by a pair of toothed conveyor belts forming part of the disk transport system. Movement of the conveyor belts while engaged with the carrier teeth effects movement of the carrier in the horizontal plane.

For space considerations among other reasons, it is desirable that the horizontal movement of the disk carriers in the above-mentioned library be in a direction parallel to the front of the cabinet used to house the library. By such movement, the depth of the cabinet need not be substantially greater than the width of the disk carriers. Since the disk carrier in the above library can only be advanced in a direction parallel to those edges of the carrier bearing the transport teeth, the carriers must be arranged in their respective storage slots so that their respective toothed edges are parallel to the front of the library cabinet. While such an arrangement of disk carriers can be readily achieved by merely opening the cabinet and manually inserting the carriers in the storage rack in the desired orientation, such an approach would sacrifice the "clean room" integrity of the cabinet which, at least in optical recording libraries, is crucial. Also complicating the disk loading process is that each disk carrier (and its associated disk) is commonly housed by a protective, box-like container, sometimes known as a "caddy", which serves to keep the recording surfaces free of dust and debris whenever the disk is outside the confines of the library.

SUMMARY OF THE INVENTION

An object of this invention is to provide an improved disk-loading station for an automated disk library, a disk-loading station which is improved from the standpoint that it can (a) receive disk carriers and their respective disks in an orientation different from that in which the disk carriers must be oriented for transport within the library, and (b) reorient such disk carriers so that they can be acted upon by the library's internal disk carrier transport apparatus.

The disk loading station of the invention basically comprises means for receiving a disk carrier from a first direction, and means for rotating such carrier by 90 degrees, whereby the disk carrier is positioned to be discharged from the loading station in a direction substantially perpendicular to the direction in which it is received. Preferably, the carrier loading station of the invention further comprises means for receiving a disk carrier contained by a protective caddy, and means for extracting the carrier from the caddy prior to reorientating the carrier for discharge in a direction perpendicular to the direction in which the caddy is received.

The invention will be better understood from the ensuing detailed description of a preferred embodiment, reference being made to the accompanying drawings.

DETAILED DESCRIPTION OF PREFERRED EMBODIMENTS

Figure 1:
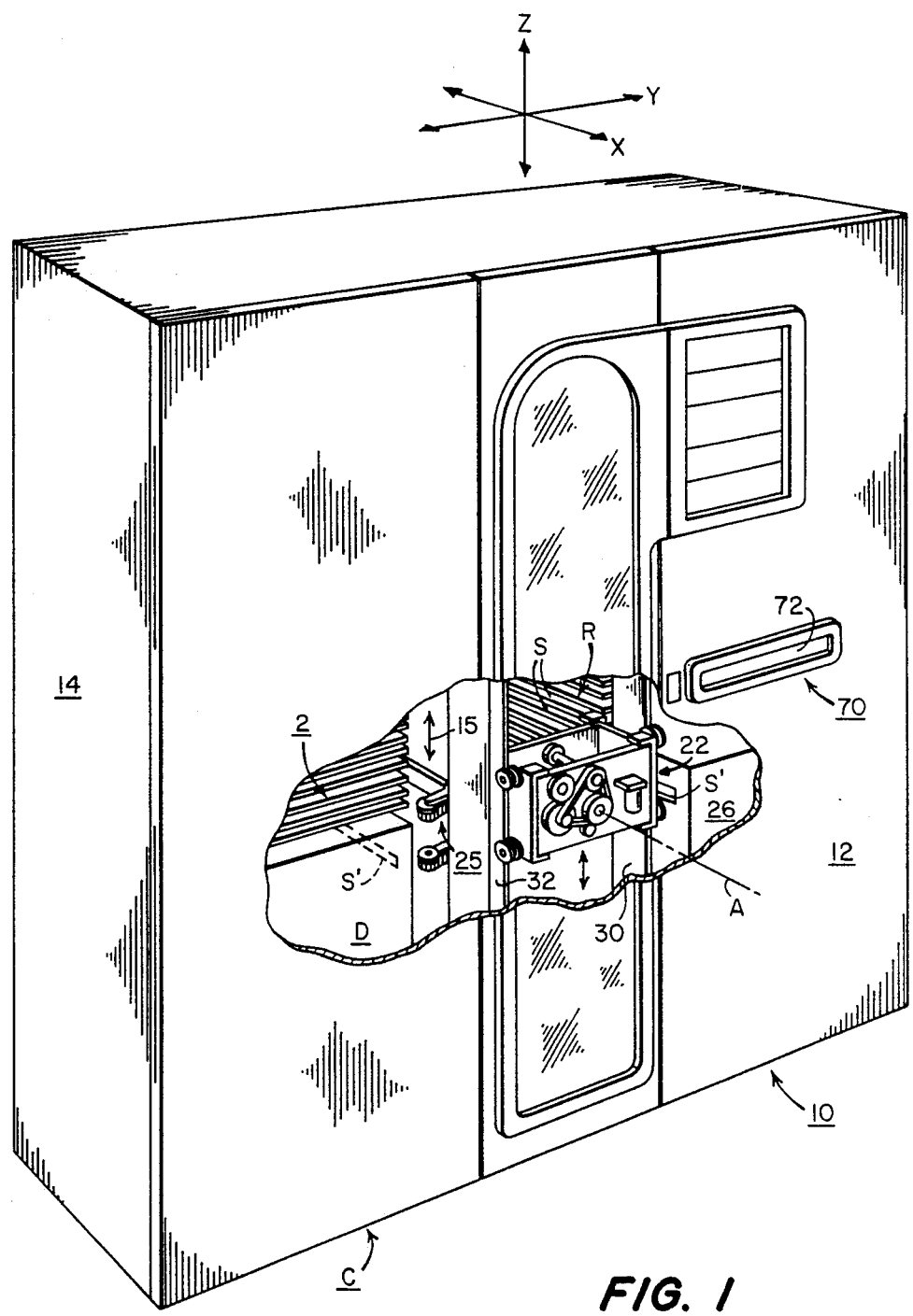
FIG. 1 is a perspective overview of an automated disk library embodying the invention.

Referring now to the drawings, FIG. 1 illustrates an automated disk library 10 for storing and utilizing a relatively large number (e.g. 50–150) of data storage disks (e.g. optical disks). Such apparatus comprises a cabinet C having a front wall 12 extending along a Y axis, and a pair of spaced, parallel end walls 14 extending rearwardly of the front wall along an X axis. The cabinet supports one or more disk drive units D, and one or more storage racks R for storing the data storage disks in spaced, parallel, horizontal planes. A disk transport mechanism 22 movable along a vertical corridor 15, i.e., along the Z axis, serves to transport selected disks between their respective positions within the storage rack(s) and the disk drive unit(s). Such transport mechanism may included means for grasping the disks by the lateral edges of a disk-supporting "carrier " and for moving such carrier along the Y axis, into and out of the disk receiving slots S, S' of the storage racks and disk drive units, respectively. The transport mechanism and the manner in which it operates to transport disks are better disclosed in the aforementioned U.S. application Ser. No. 19,903, filed on Feb. 27, 1987 in the names of Deck et al.

Figure 2:
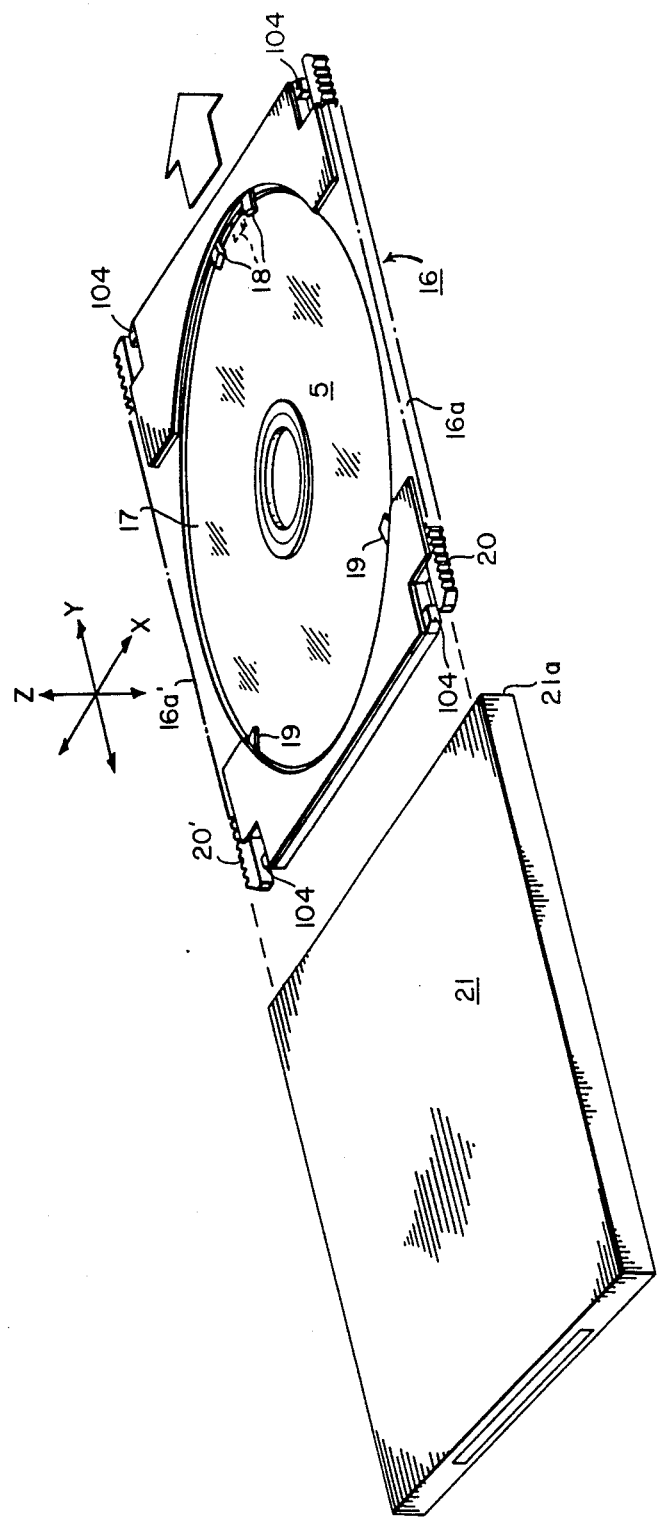
FIG. 2 is a perspective view of a data storage disk assembly and its protective caddy.

As best shown in FIG. 2, each of the data storage disks 5 is supported at spaced locations about its periphery by a carrier 16 of generally rectangular configuration. Carrier 16 defines a circular aperture 17 in which a plurality of spaced tabs 18 are provided. Such tabs function to support a disk from both sides over a few degrees of arc length. The disk carrier also comprises a pair of releasable latches 19 which releasably support the disk at two other spaced locations to maintain the disk approximately centered in the carrier aperture 17. Prior to use, the disk is released from the carrier by a mechanism (forming part of the disk drive unit) which acts upon the releasable latches and disk carrier.

To facilitate handling and movement of the disk carrier and its associated disk within the library, the carrier is provided with two racks 20, 20' of teeth which extend along the entire lateral edges 16a, 16a', respectively, of the carrier. These racks of teeth are adapted to be engaged by a pair of toothed conveyor belts which form part of the aforementioned disk transport mechanism (briefly described below) to advance the carrier along the Y axis, in the plane of the carrier. During periods of non-use, the carrier/disk assembly is housed in a protective, box like caddy 21. Entrance to the caddy is gained through a spring-loaded door (not shown) located in the leading end 21a of the caddy housing. As will be explained below, the carrier/disk assembly is automatically extracted from the caddy during the process of loading the library with disks. After extracting the carrier/disk assembly from the caddy, the caddy is returned to the user.

Figure 3:
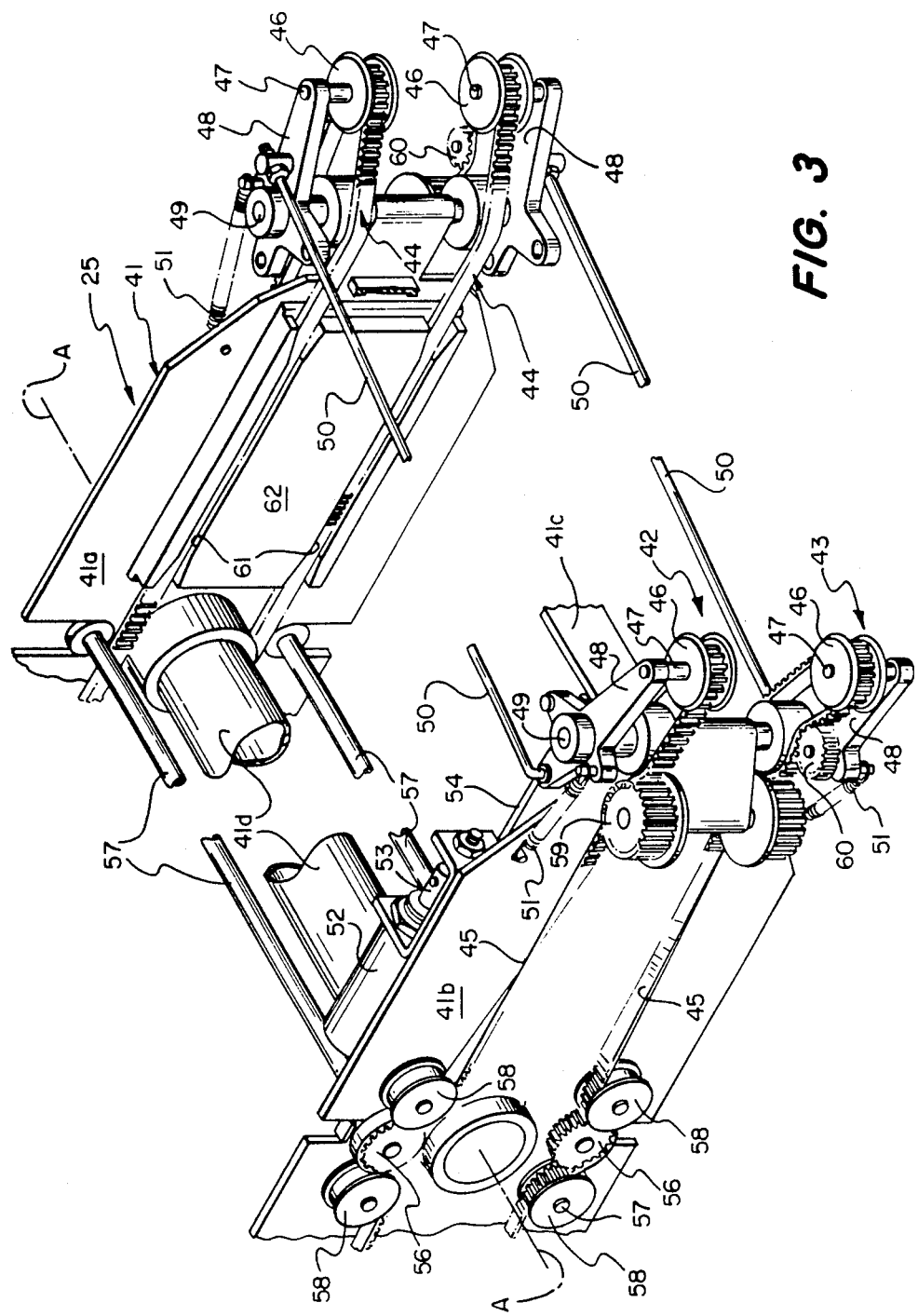
FIG. 3 is a partial perspective view of a disk picker assembly for transporting disk carriers within the apparatus shown in FIG. 1.
Figure 4A:
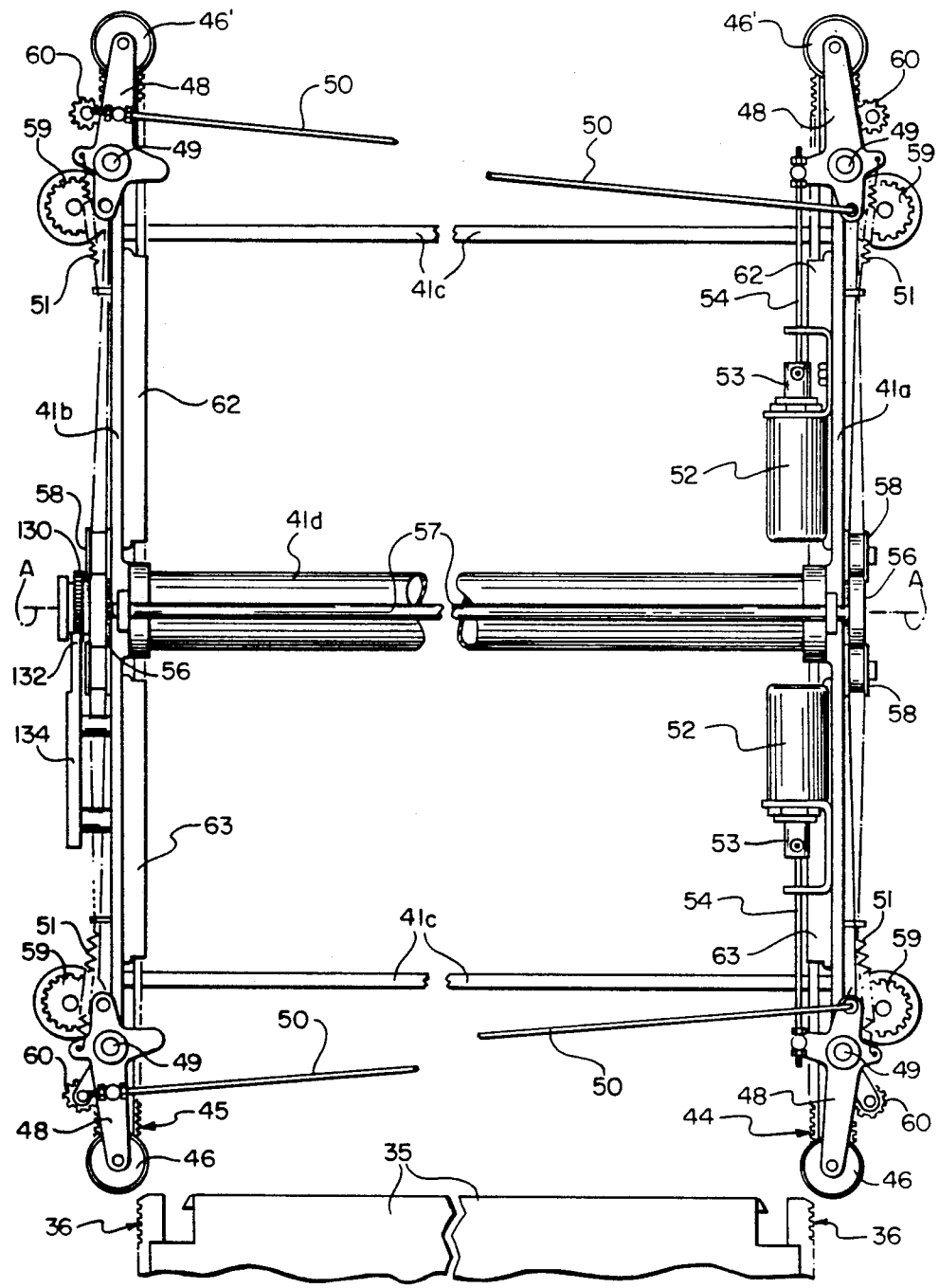
FIG. 4A and 4B are top plan and side elevational views of the FIG. 3 assembly.
Figure 4B:
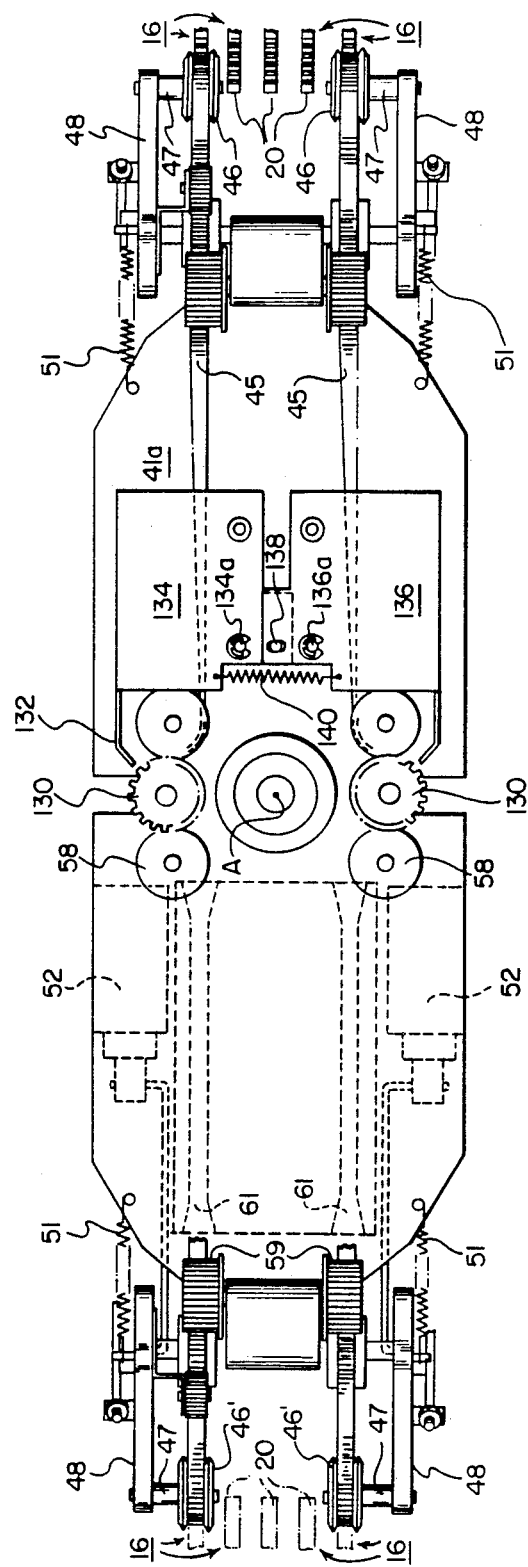

Referring now to FIGS. 3, 4A and 4B, disk transport mechanism 22 comprises a disk picker assembly 25 which is supported for rotation about an axis A by a drive unit 26 (shown in FIG. 1). Drive unit 26 is mounted for bi-directional vertical movement along a pair of vertical rails 30, 32 and is driven therealong by a motor (not shown). During vertical movement of the drive unit, the disk picker assembly is transported up and down the vertical corridor 15 between the disk storing racks. The disk picker assembly is adapted to extract carrier/disk assemblies from either rack (or from any disk drive) by moving such assemblies along the Y axis. Having extracted a carrier/disk assembly from storage, the picker assembly is vertically advanced to locate the "picked" assembly in a position in which the picker assembly can be again operated to advance the carrier/disk assembly into a selected disk drive or another storage slot.

Disk picker assembly 25 comprises a frame 41 which supports two independently operable, bi-directional carrier conveyor mechanisms, 42, 43, one being located directly above the other. Each of the carrier conveyor mechanisms comprises a pair of spaced endless conveyor belts 44, 45, each belt being trained about a pair of spaced flanged rollers 46, 46' which are rotatably supported at opposite ends of the picker frame 41. As best shown in FIGS. 3 and 4A, frame 41 is generally rectangular in shape, comprising a pair of sidewalls 41a, 41b connected at their respective ends by struts 41c and at their respective centers by a central axle 41d. Each of the flanged rollers 46 is journalled for rotation about a pin 47 supported by a "t"-shaped arm 48 which, in turn, is pivotally mounted on a pin 49 supported by the frame sidewalls. Adjustable tie rods 50, serve to couple opposing pivotal arms so that, as one arm pivots, the opposite arm pivots an equal amount and in an opposite direction. As is apparent, as opposing pivotal arms move toward each other, the spacing between their supported flanged rollers 46 is reduced. Springs 51 serve to bias the opposing and coupled pivotal arms to an "open" position in which their associated flanged rollers are spaced relatively far apart. A solenoid 52 serves to control the relative position of each opposing pair of pivot arms. When activated, the solenoid plunger 53 is withdrawn, as shown in FIG. 4A, and, via tie rods 50 and 54, the pivot arms are moved to a "closed" position in which the flanged rollers are spaced relatively close together. When opposing pivot arms are in a closed position, their associated conveyor belts will engage the opposing racks of teeth on a selected disk carrier, thereby enabling transport of the carrier by the conveyor belts.

Each of the conveyor belts 44 and 45 has a toothed structure which is adapted to engage and mesh with the rack of teeth 20, 20' supported by the opposing lateral edges of the disk carriers. The carrier conveyor belts are driven by gears 56 mounted on drive shafts 57. Each drive shaft is rotatably supported by the frame walls 41a and 41b and are selectively driven in either clockwise or counterclockwise directions by a bi-directional drive unit. As best shown in FIG. 3, each conveyor belt is guided along its endless path by a pair of flanged rollers 58 arranged on opposite sides of the drive gears 56, each roller 58 being rotatably supported by the picker frame walls. In order to orient each belt so that it may engage the carrier racks 20, 20', a quarter-twist (90 degrees) is provided in each belt between rollers 58 and a toothed idler roll 59 which is rotatably supported by the picker frame in the vicinity of the picker arms. Tension in each belt is controlled by the position of a small toothed roller 60 which is rotatably mounted on one of the two pivot arms which serves to support each conveyor belt. In the interior of the picker frame, the conveyor belts are guided by slots 61 formed in each of a pair of pads 62, 63 supported by the frame walls. (See FIG. 3.) Opposing pads supported by the frame walls are spaced such that a disk carrier will be supported by their associated slots during transport by the conveyor belts.

Disk picker assembly 25 is dimensioned so that its length, as measured between flanged rollers 46 and 46', is somewhat longer than the length of a disk carrier (as measured between its front and rear edges), and its width, as measured between the bottom surfaces of opposing slots 61 is slightly greater than the width of a disk carrier. As shown in FIG. 4B, the disks are stored on opposite sides of the vertical corridor 15 of the library so that the conveyor belts of the picker assembly can engage disk carriers on either side of this vertical corridor. When one of the four solenoids 52 is actuated, a pair of opposing rollers 46 (operatively associated with such solenoid) will move to a closed position in which the teeth of the conveyor belt supported thereby engage the outermost ends of the opposing racks 20, 20' of a selected disk carrier. When the appropriate drive shaft 57 is rotated, the conveyor belts act upon the disk carrier to withdraw the carrier into the central region of the picker assembly, at which point the disk carrier is supported by opposing slots 61 in pads 62. To properly orient the disk so that a desired side will be presented to the disk drive, the picker assembly is rotable axis A. The drive unit for selectively driving the carrier-conveying mechanisms 42 and 43 of the picker assembly 25 and for selectively rotating the picker assembly about axis A is described in the aforementioned Deck et al application.

As is evident from the drawings, carrier conveyor mechanisms 42, 43 can only operate to transport disk carriers along the Y axis, that is, in a direction parallel to the front of the cabinet. Thus, in order to be engaged and driven by the endless conveyor belts 44 and 45, the carriers must be prearranged in their respective storage locations (or disk drive) so that their respective racks 20, 20' extend parallel to the front of the cabinetry. According to the invention, such prearrangement can be achieved by a disk-loading station 70 which is adapted to (1) accept caddy-housed carrier/disk assemblies presented to the library through a slot 72 (FIG. 1) provided in the cabinet's front wall 12, (2) extract the carrier/disk assembly from the caddy, (3) return the caddy to the exterior of the cabinet; and (4) rotate the carrier disk assembly by 90 degrees to orient the assembly so that the conveyor belts 44, 45 of the carrier conveyor mechanisms can engage the carrier racks and thereby advance the carrier to the center of vertical corridor 15, along which the carrier can be further advanced (vertically) to a desired storage slot or disk drive. The carrier load station is also adapted to (1) receive a carrier/disk assembly from the conveyor mechanisms 42, 43; (2) rotate such assembly by 90 degrees; (3) reload the rotated assembly into an empty caddy presented through slot 42, and (4) return the caddy-housed carrier/disk assembly to the user through slot 72.

Figure 5A:
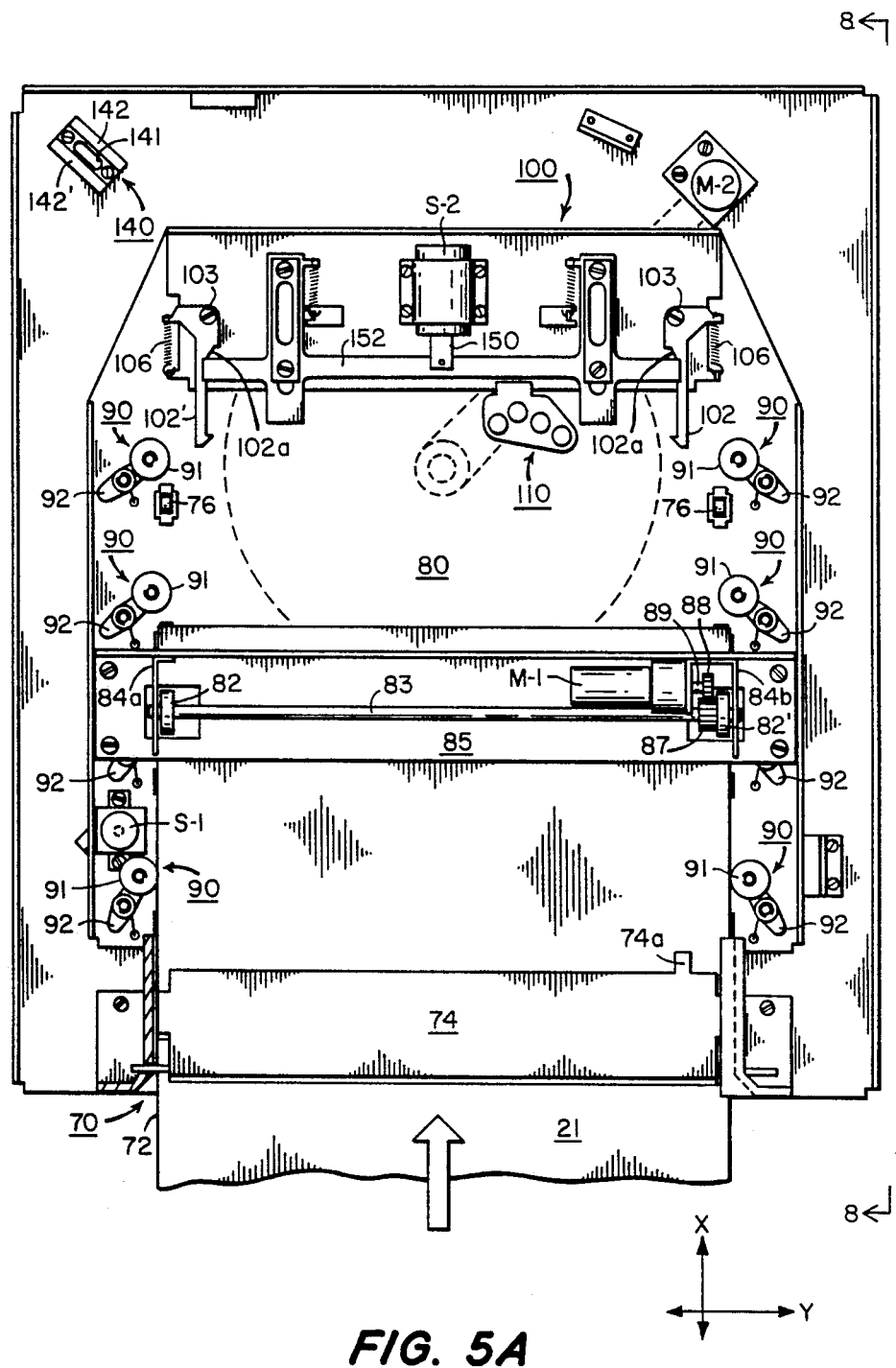
FIGS. 5A and 5B are top plan views of a preferred embodiment of the disk carrier loading station of the invention showing the relative position of elements at different times during the loading cycle.
Figure 8:
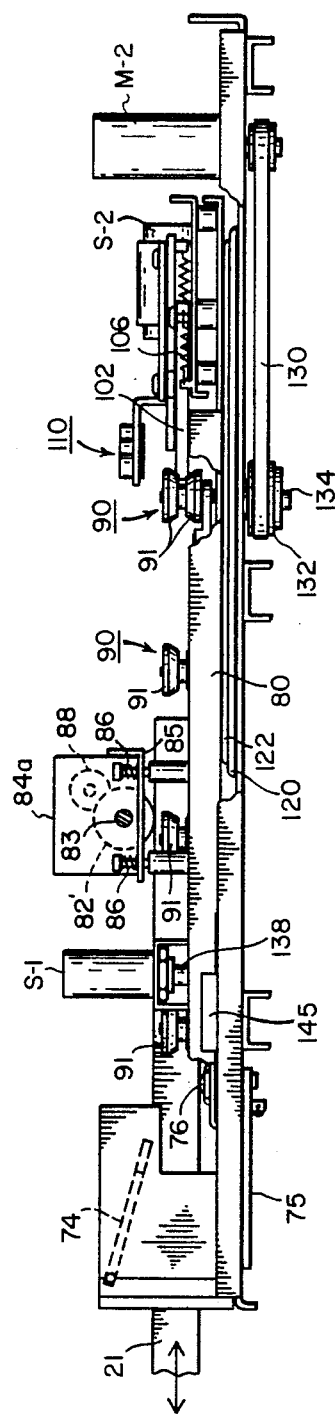
FIG. 8 is a side elevation of the apparatus shown in FIGS. 5A and 5B.
Figure 9:
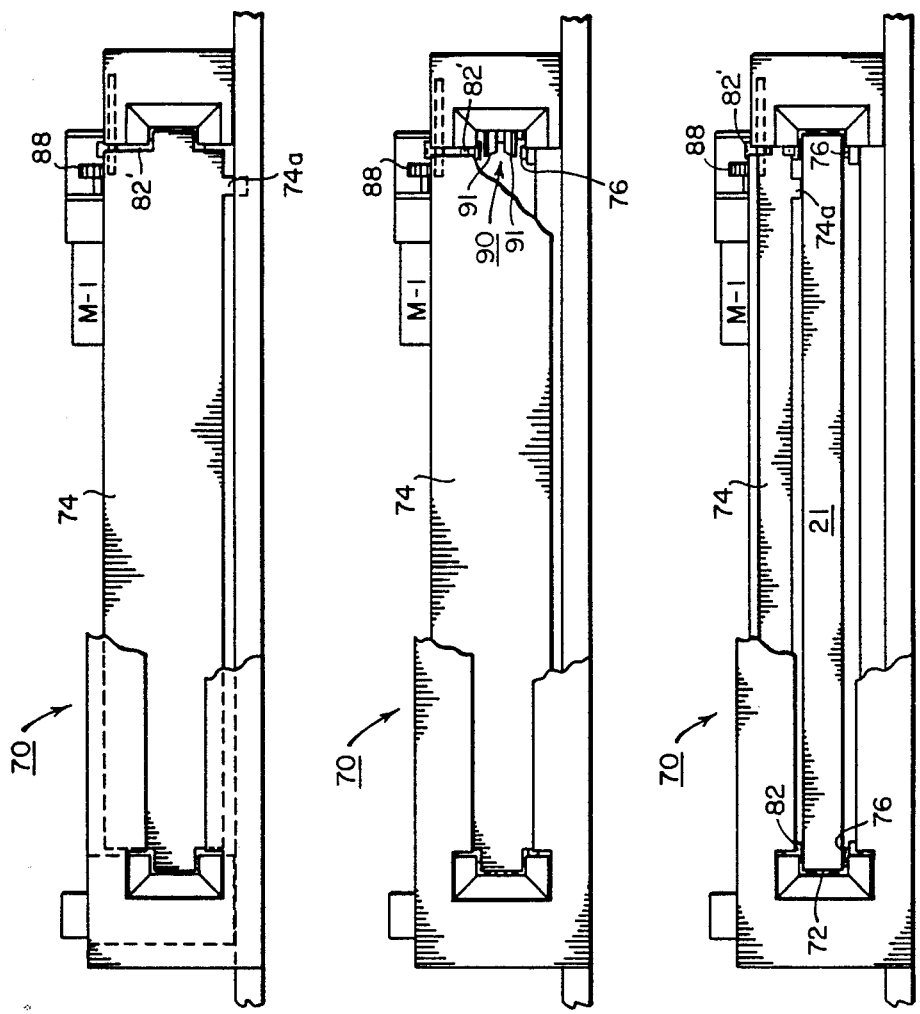
FIGS. 9A-9C are front elevations of a portion of a preferred disk-loading station of the invention.

Referring now to the remainder of the drawings, FIG. 5A is a top plan view of a preferred embodiment of the disk-loading station of the invention. As shown, a caddy 21 containing a carrier/disk assembly and moving in the direction of the arrow has partially entered the library through slot 72. Movement of the caddy to the approximate position shown is effected manually. During such manual loading of the caddy, the caddy displaces a spring-loaded, hinged door 74 which normally blocks the entrance slot 72 and thereby prevents contaminates from entering the library. As the caddy moves into the library interior, its bottom surface is supported by a series of idler rollers 76 which are rotatably supported by a base plate 80. When the caddy reaches the position shown in FIG. 5A, the forward portion of its top surface is frictionally engaged by a pair of driven scuff rollers 82, 82' which are journalled for rotation on a rotatably driven shaft 83. The latter is rotatably supported by a pair of flanges 84a, 84b extending from an L-shaped bracket 84 spanning the width of the caddy. A plurality of springs 86 (FIG. 8) serve to spring bias bracket 84 downward so that rollers 82, 82' exert downward pressure on the caddy, as supported by rollers 76 Shaft 83 also supports a gear 87 which meshes with a driven gear 88 carried by the drive shaft 89 of a bi-directional motor M-1. Photoelectric sensing means (not shown) are provided for sensing the leading end of the caddy after it has been manually advanced to the position shown in FIG. 5A. The output of such sensor serves to activate motor M-1; thereby causing the rubber rollers 82, 82' to further advance the caddy in the direction of the arrow shown in FIG. 5A, i.e., along the X axis.

As the caddy is advanced along the X axis by rollers 82, 82', two sets of flanged idler rollers 90, disposed along side the caddy's path, engage the lateral edges of the caddy. These rollers serve to guide the caddy in the X direction and, as explained below, provide support for the carrier/disk assembly after it has been extracted from the caddy. Each of the idler rollers 90 is rotatably mounted on an arm 92 which is pivotally mounted on the base plate 80. Spring means are provided for biasing the arms so that their respective rollers 90 are positioned in the path of travel of the caddy. In FIG. 5A, two of the idler rollers 90, on each side of the caddy are shown to have already engaged the lateral edges of the advancing caddy and have thereby been pivoted, against the spring bias force, to positions displaced from their rest positions. The other two idler rollers, downstream of the advancing caddy, have yet to be engaged and displaced by the caddy.

Rollers 82, 82' continue to be rotatably driven in a direction to advance the caddy until the leading edge of the caddy is engaged by a carrier-latching mechanism 100. Such mechanism comprises a pair of spring-loaded latch members 102, 102' which are pivotally mounted on turntable 80 on pivot pins 103. Such latching mechanism and its interaction with the carrier/disk assembly are disclosed in the commonly assigned U.S. application Ser. No. 923,508 filed on Oct. 27, 1986 in the names of D. Petruchek et al. Briefly, however, as the carrier advances forward, the latching members penetrate the aforementioned spring-loaded door on the end of the caddy and engage a pair of bevelled tabs 104 associated with the disk carrier. See FIG. 5B. Continued forward movement of the caddy/carrier causes the latch members to spread apart, against the spring bias force, provided by springs 106. After the bevelled tabs on the carrier pass similarly bevelled hooks on the latch members, the latter snap back into the position shown in FIG. 5B, thereby latching the carrier in the position shown. Photoelectric sensing means 110 produces an output signal indicating that the caddy has moved sufficiently forward to achieve carrier latching, and this signal is used to change the mode of operation of the bi-directional motor M-1, causing such motor to reverse the direction of rollers 82, 82'. As rollers 82, 82' rotate in the reverse direction, they function to advance the caddy in the opposite direction, thereby returning the caddy to the user through slot 72.

As the caddy is advanced through slot 72 to a position in which it can be manually withdrawn from the library interior, it leaves behind the carrier/disk assembly which, as noted above, is prevented from following the caddy by the latching mechanism. As the caddy is extracted from the library, the carrier/disk assembly becomes supported in a horizontal plane by the spaced flanges 91 on rollers 90 which, as already noted, are spring biased into engagement with the carrier's lateral edges 16a, 16a' and the toothed racks 20, 20' disposed therealong. As the caddy is withdrawn from the library, door 74 swings downward about pivot pins 93, to a "closed" position (e.g., shown in FIG. 10) in which it covers entrance slot 72. A latching mechanism 75 is provided to prevent door 74 from being moved to its "open" position during subsequent movement of the carrier/disk assembly, described below.

Figure 5B:
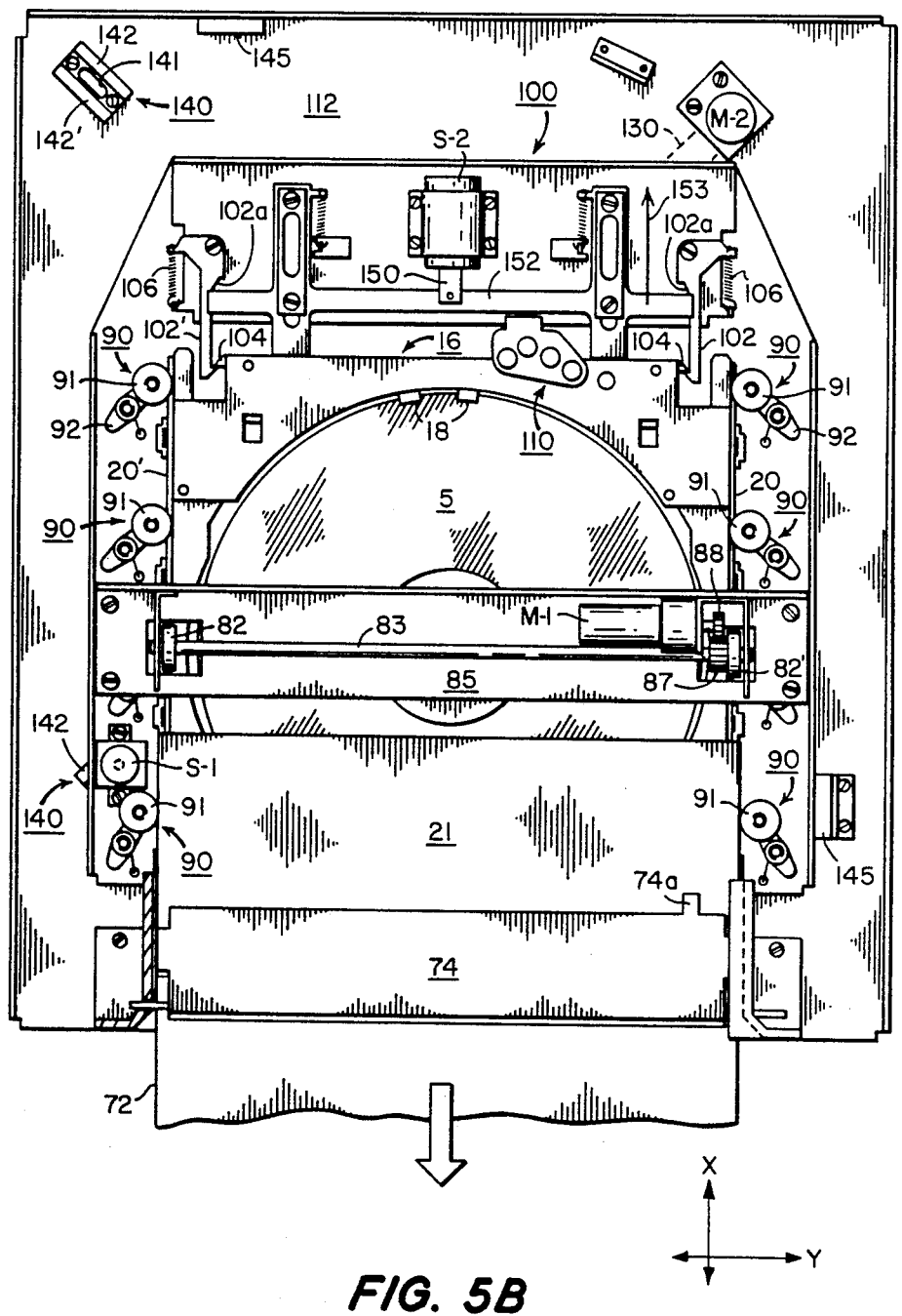
Figure 6:
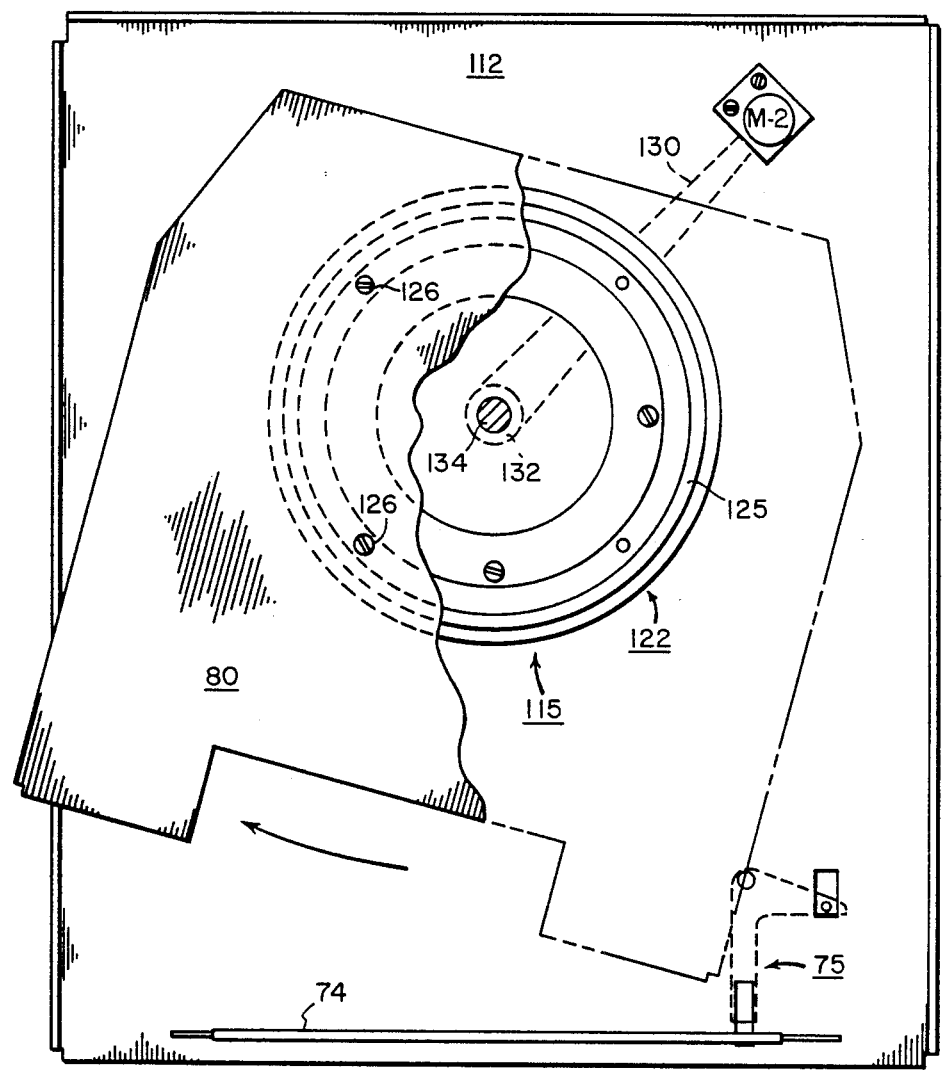
FIG. 6 is a partial cut-away of a portion of the apparatus shown in FIGS. 5A and 5B.
Figure 7:
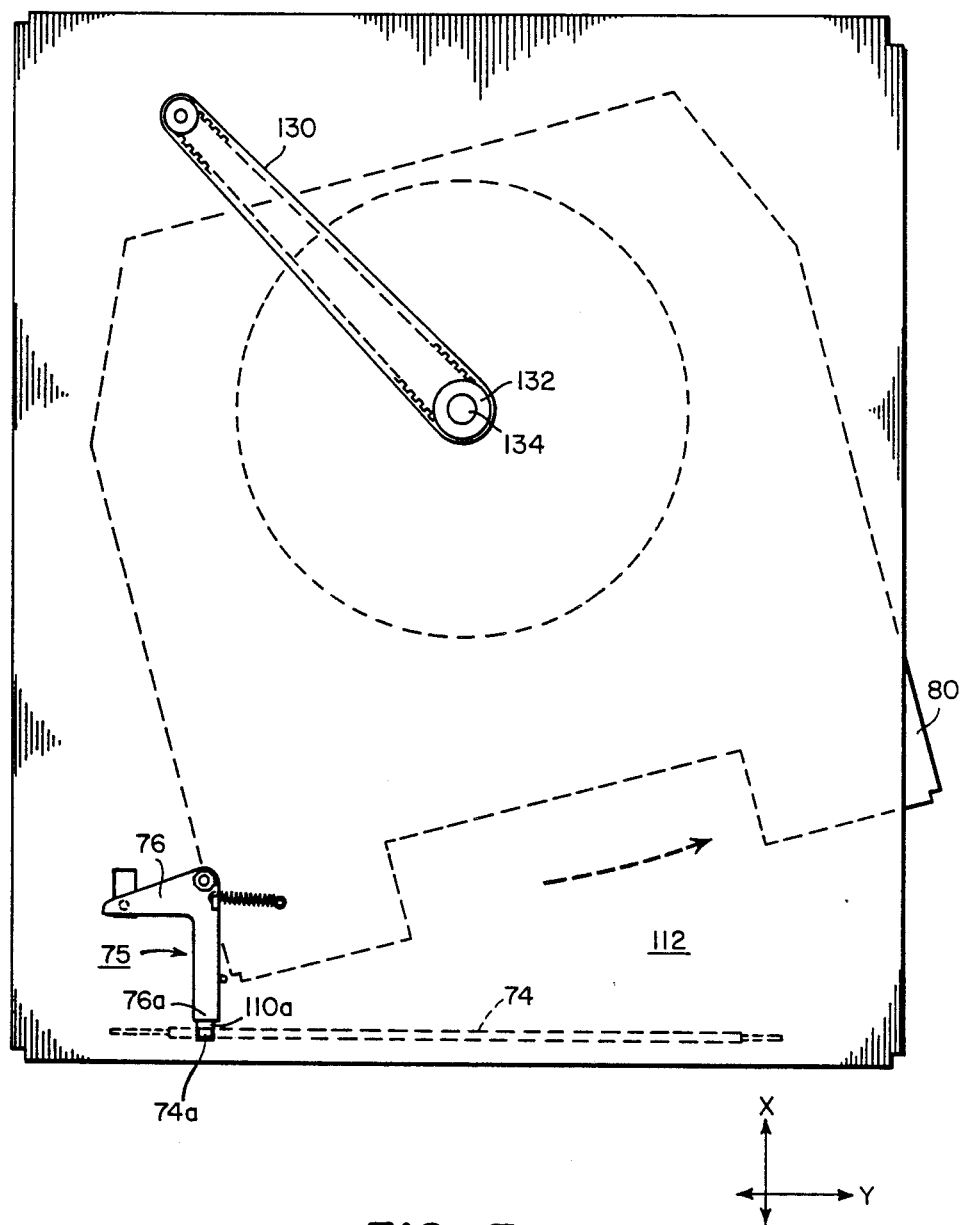
FIG. 7 is a bottom view of the FIG. 6 apparatus.
Figure 10:
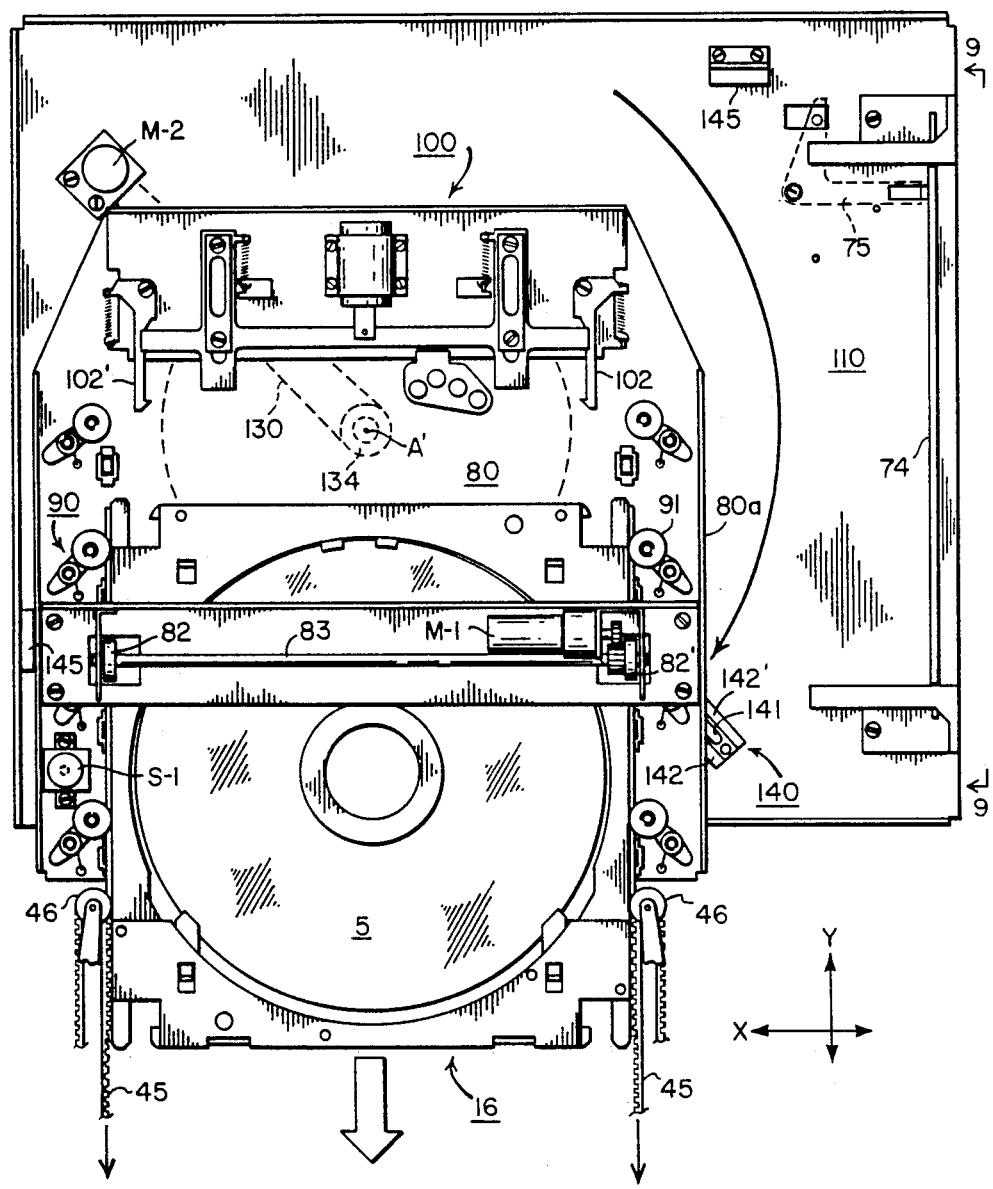
FIG. 10 is a top plan view of the FIG. 5A apparatus after a carrier support has undergone a 90 degrees rotation.

In order for the extracted carrier/disk assembly, now supported by flanged rollers 90 in the position shown in FIG. 5B, to be transported from the disk-loading station to an assigned storage rack or disk drive, it is necessary to rotate the assembly by 90 degrees. Only after being rotated 90 degrees, to the position shown in FIG. 10, is the carrier/disk assembly oriented to be engaged by toothed conveyor belts 45 of the carrier conveyor mechanisms 42, 43. Such rotation of the carrier/disk assembly is effected by rotatably mounting base plate 80 on a support plate 112 by a "lazy-Susan" assembly 115, best shown in FIGS. 6–8.

Assembly 115 basically comprises a pair of ring-shaped plates 120, 122 (FIG. 8) which support therebetween a circular bearing 125 which allows plate 122 to rotate relative to plate 120. Plate 122 is rigidly coupled to base plate 80 by a plurality of fasteners 126, whereas plate 120 is rigidly coupled to support plate 112 by suitable fasteners (not shown). By this arrangement, base plate 80 and the carrier/disk assembly it supports, can rotate relative to the underlying support plate 112.

Selective rotation of base plate 80 is effected by a belt drive comprising a bi-directional motor M-2 and an endless drive belt 130. The latter is trained about a first pulley 131 mounted on the drive shaft 132 of motor M-1, and about a second pulley 133 mounted on a shaft 134 depending from plate 80 through a circular bearing in plate 112. To produce a 90 degrees rotation of base plate 80, from the position shown in FIGS. 5A and 5B to the position shown in FIG. 10, motor M-2 is appropriately energized to cause belt 130 to move in a clockwise direction, as viewed in FIG. 6. Such movement of the belt causes shaft 134 to rotate clockwise, thereby imparting clockwise movement of the base place which is rigidly coupled to shaft 134. In a similar manner, motor M-2 is energized by the application of a voltage of opposite polarity to cause belt 130 to move in a counter-clockwise direction, thereby rotating the base plate 80 by 90 degrees, from the position shown in FIG. 10 to the position shown in FIGS. 5A and 5B.

Prior to energization of motor M-2, base plate 80 is freed from a locked position in which a spring-loaded pin 138 (FIG. 8) is engaged with either of a pair of stop mechanisms 140. The vertical position of locking pin 138 is controlled by a solenoid S-1. When energized, solenoid S-1 withdraws the pin from a position located in a slot 141 defined by a pair of ramps 142, 142' comprising the stop mechanism. A pair of resilient bumpers 145 prevent the base plate from substantially overshooting a position in which the locking pin engages slot 141. If overshoot occurs, the plate rebounds off one or the other resilient bumpers to a position in which locking occurs.

Whenever the carrier locating station is not in a condition to receive a carrier from the library exterior, it is desirable that door 74 be in a "closed" and latched condition. With this in mind, door 74 is provided with a tab 74a which cooperates with a L-shaped arm 77 of the aforementioned door latching mechanism 75 to achieve the latching function. Arm 77 is pivotally mounted on a pivot pin 78 depending from the bottom surface of support plate 110. A spring 79 serves to bias arm toward a position located against a stop pin P. In this position, one end 76a of arm 76 is positioned opposite door tab 74a, preventing the door from swinging inward toward an open position. After an empty caddy is withdrawn from slot 72, door 74 swings down to its vertical position blocking slot 72. In this position, tab 74a passes through a slot 110a in support plate 110. As base plate 80 approaches its load/unload position, as shown in FIGS. 5A and 5B, its lateral edge 80a engages an upright member 73 supported by arm 76 and causes the arm to pivot about its supporting pivot pin to a position in which end 76a is displaced from door tab 74a, thereby allowing the door to open. When base plate 80 begins to rotate, it allows arm 76 to pivot to the position shown in which arm end 76a is in a position to block movement of tab 74a toward the interior of the library.

To release a carrier/disk assembly from the carrier latching mechanism 100 so that the carrier may either be transported by the picker assembly 25, or so that the carrier may be returned to a caddy during a carrier unloading cycle (described below), a solenoid S-2 is energized. When energized, solenoid S-2 withdraws plunger 150 which, in turn, moves an unlatching bar 152 in the direction of the arrow 153. In moving in this direction, bar 152 engages a pair of cam surfaces 102a on latching members 102, 102', thereby causing these members to spread apart, against the force provided by springs 106. In moving apart, latching members 102 disengage carrier tabs 104, and thereby enable the carrier/disk assembly to be advanced away from the latching mechanism.

To unload a carrier/disk assembly from the disk library, disk picker assembly 25 delivers a selected carrier/disk assembly to the disk loading station in direction opposite the arrow shown in FIG. 10. The conveyor belts 45 advance the carrier to a forward position in which the carrier again becomes latched by latching members 102, 102' of mechanism 100. Motor M-2 is then energized to rotate base plate 80 by 90 degrees to the FIG. 5A position, at which point door 74 becomes unlatched and the loading station is ready to receive an empty caddy. Such caddy is manually inserted to a position in which it is automatically advanced by rollers 82. As the empty caddy enters the load station, the carrier/disk assembly enters the caddy interior through its spring-loaded end door. After the caddy has moved to its forward most position within the carrier load station, in which position it totally encloses the carrier/disk assembly being unloaded, solenoid S-2 is again energized, thereby causing the latching members 102, 102' to separate and release the carrier tabs 104. Motor M-1 is then operated in the reverse direction, causing rollers 82 to advance the now loaded caddy through slot 72 to the library exterior.

From the foregoing description, it will be appreciated that the disk-loading station of the invention affords the advantage of enabling the disk library to receive a carrier/disk assembly from a direction perpendicular to that in which such assembly is transported, to and from storage, within the library. This allows loading of the library through the library cabinet's front wall, rather then through an end wall which would tend to limit the placement of the cabinet due to the increased space requirements.

The invention has been described in detail with particular reference to preferred embodiments thereof, but it will be understood that variations and modifications can be effected within the spirit and scope of the invention.

We claim:

1. In an apparatus for storing and utilizing a plurality of data storage disks, each of such disks being supported in a generally rectangular, planar carrier having structure associated therewith which facilitates a reciprocating movement of such carrier along a predetermined axis in the plane of such carrier, said apparatus comprising a cabinet which contains:

disk storage means comprising a frame defining a plurality of spaced, parallel storage slots for storing a plurality of disk carriers, one above the other in spaced parallel planes, each of said slots being positioned and adapted to receive and store a disk carrier presented thereto from a predetermined direction;

disk utilization means for utilizing data storage disks, said utilization means having an access slot adapted to receive a disk carrier from a direction parallel to said predetermined direction; and disk carrier transport means movable along a disk transport path for transporting disk carriers between said storage means and said utilization means, said transport means comprising means for engaging such disk carrier structure and for moving a disk carrier along said predetermined axis and in said direction, into and out of said disk storage and access slots:

the improvement comprising:

disk carrier loading means for receiving a disk carrier from the exterior or said cabinet and for moving such carrier to a position adjacent said transport path in which it can be engaged and further transported to either said storage means or said utilization means by said disk carrier transport means, said loading means comprising means for receiving a disk carrier from a direction perpendicular to said predetermined direction, means for supporting a received disk carrier in a plane parallel to said spaced planes, and means for rotating such supported disk carrier by about 90 degrees in the plane in which it is supported, whereby said frame structure is positioned to be engaged by said transport means after a supported carrier has been rotated by said rotating means.

2. The apparatus as defined by claim 1 wherein a disk carrier, prior to receipt by said loading means, is contained by a protective caddy, and wherein said loading means further comprises means for extracting the carrier from its caddy prior to rotating the carrier.

3. The apparatus as defined by claim 1 wherein said loading means comprises a rotatably mounted platform, latching means supported on said platform for latching a received caddy in a predetermined position, relative to said platform, and means for selectively rotating said platform by about 90 degrees.

4. The apparatus as defined by claim 2 wherein said loading means comprises a rotatably mounted platform, latching means supported on said platform for latching a received caddy in a predetermined position, relative to said platform, and means for selectively rotating said platform by about 90 degrees, and wherein said extracting means is mounted on said platform.

5. In a data storage disk library comprising a cabinet containing (a) means for storing and writing and/or reading information on a plurality of data storage disks, each of such disks being releasably supported by a planar carrier having structure associated therewith which facilitates movement of the carrier in a predetermined direction in the plane of the carrier; and which contains: (b) disk transport means having means engagable with said carrier structure for selectively moving disks in said predetermined direction; the improvement comprising:

disk loading means for loading disk carriers into said cabinet from the exterior of said cabinet at a position in which they can be acted upon by said disk transport means, said disk loading means comprising means for receiving a disk carrier moving toward said cabinet in a direction perpendicular to said predetermined direction, means for supporting a received disk carrier in a horizontal plane, and means for rotating said support means by 90 degrees in such horizontal plane.

* * * * *